United States Patent

[11] 3,616,128

| [72] | Inventor | Norman E. Pacourek<br>Marshfield, Wis. |
|---|---|---|
| [21] | Appl. No. | 64,060 |
| [22] | Filed | July 24, 1970 |
| [45] | Patented | Oct. 26, 1971 |
| [73] | Assignee | Weyerhaeuser Company<br>Tacoma, Wash.<br>Continuation of application Ser. No.<br>667,683, Sept. 14, 1967, now abandoned. |

[54] DIMENSIONALLY STABLE HARDWOOD PANEL AND A METHOD OF FORMING THE SAME
7 Claims, 2 Drawing Figs.

[52] U.S. Cl. .................................................. 161/56,
144/313, 156/154, 156/313, 161/165
[51] Int. Cl. ............................................... B32b 21/12
[50] Field of Search ........................................ 52/615;
144/309, 313, 320; 161/56, 162, 168–170, 165,
123; 156/154, 268, 313

[56] References Cited

UNITED STATES PATENTS

| 1,265,841 | 5/1918 | Walker | 144/309 UX |
|---|---|---|---|
| 1,299,747 | 4/1919 | McClain | 161/56 UX |
| 1,387,011 | 8/1921 | Ratcliff | 161/56 X |
| 3,160,543 | 12/1964 | Elmendorf | 161/56 UX |

FOREIGN PATENTS

| 138,615 | 8/1947 | Australia | 52/615 |
|---|---|---|---|

*Primary Examiner*—William A. Powell
*Attorneys*—Leslie G. Noller, John M. Crawford and Patrick D. Crawford ABSTRACT: A dimensionally stabilized plywood panel having an inner core of force-resistant material, face and back plies, the back ply having a grain direction perpendicular to the face ply.

PATENTED OCT 26 1971

3,616,128

INVENTOR
NORMAN E. PACOUREK
BY
ATTORNEYS

DIMENSIONALLY STABLE HARDWOOD PANEL AND METHOD OF FORMING THE SAME

This application is a continuation of application Ser. No. 667,683, filed Sept. 14, 1967, now abandoned.

BACKGROUND OF THE INVENTION

It is well known that wood changes dimensions markedly under changing moisture conditions in a direction transverse to the grain with, however, good dimensional stability parallel to the grain. In conventional plywood, where the face and back plies are of the same species and thickness and the inner core is wood veneer, the resulting laminated material is quite stable during changes in moisture content. Conventional ¼-inch hardwood plywood is composed of three plies of wood veneer. Normally, the two outer plies are from 1/24 inch–1/36 inch in thickness, and are secured to the inner veneer with their grain directions parallel to each other. The inner ply is about one-sixth inch in thickness and is at right angles to the outer plies in grain direction.

Numerous patents have issued dealing with improving the stability of various types of plywood panels. For example, in U.S. Pat. No. 2,286,068, a dimensionally stable softwood plywood panel having the face and back plies of substantially the same thickness parallel in grain direction to each other, is obtained by random grooving of the face ply of the panel. In U.S. Pat. No. 2,363,987, there is described a softwood plywood panel which is dimensionally stable made by initially laying up an unbalanced panel, that is one wherein the two face plies are of an unequal thickness, and balancing the unbalanced panel by grooving the thicker ply to reduce it to an effective thickness equaling the thickness of the opposite face ply. U.S. Pat. No. 2,782,488 describes a method of making a balanced grooved plywood panel wherein substantially the same quantity of wood is removed from each of the face and back plies by grooving thereof.

When a force-resistant core material such as particleboard or flakeboard that is relatively thick in comparison to the face and back veneers is used as the inner ply in making a hardwood plywood panel, the strength, stability and stiffness of the inner ply restrains substantially all of the dimensional changes of the wood veneers. However, when a force-resistant core material that is relatively thin in comparison to the face and back veneers is used as the inner ply, the strength and stiffness of the inner ply is inadequate to restrain the dimensional change of the face and back veneers. This lack of effective restraint by the inner core material allows the panels to expand and contract excessively in the cross-grain direction with changes in moisture content. Panels so made are difficult to use for commercial purposes and are not widely accepted.

It was found that by securing a standard thickness surface veneer to a force-resistant core material at right angles to the other standard thickness surface veneer, dimensional change was restrained. Reducing the volume of wood of both of the surface veneers by sanding, using thinner than normal veneers, or otherwise, a panel can be obtained with good dimensional stability and no excessive warpage.

SUMMARY OF THE INVENTION

This invention relates to a dimensionally stabilized panel having an inner core of force-resistant material, such as particleboard or hardboard, and face and back plies adhesively secured thereto, the face and back plies secured to the inner core with their grain directions perpendicular to each other. The face and back ply are preferably of reduced thickness and are obtained by sanding, using thinner than normal veneer, or otherwise.

As opposed to conventional ¼-inch plywood wherein the two outer plies are parallel to each other in grain direction, the panel of this invention has outer plies which are at right angles to each other in grain direction. By placing the outer plies at right angles to each other in grain direction and by using surface veneers which are thinner than normal, a panel is obtained which exhibits good dimensional stability with little or no tendency to cup or bow.

DETAILED DESCRIPTION OF THE DRAWINGS

Figure 1:
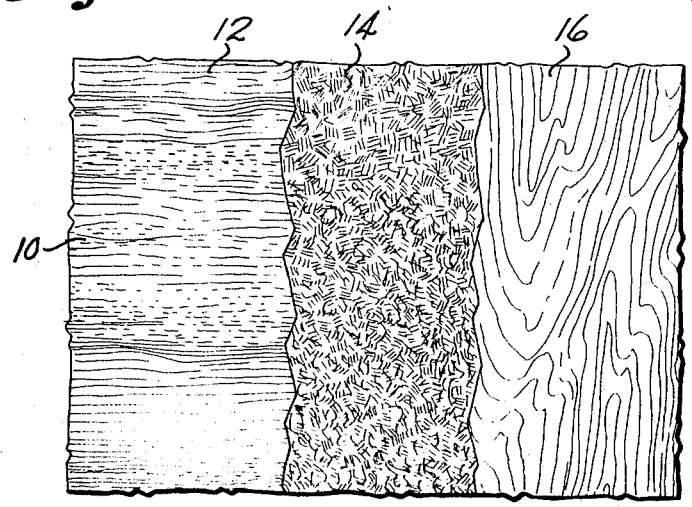
FIG. 1 is a front view of a portion of a panel with successive laminations broken away.
Figure 2:
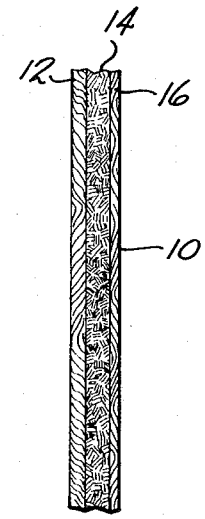
FIG. 2 is an end view of a portion of a panel showing the two outer plies having their grain directions at right angles to each other.

The panel 10 is composed of successive laminations 12, 14 and 16. The grain direction of face ply 12 runs at right angles to the grain direction of back ply 16. The core material 14 may be of any force-resistant material such as particleboard, flakeboard, hardboard, or other consolidated fiber bodies made by hot pressing fiber felts with or without resin. Usually the core material is a resin bonded material consisting of wood, disintegrated by cutting it in particles of predetermined shapes, bonded together by a bonding agent and formed into board by dry processing. The core material may have added to it any of the conventional fire-retardant materials. Other additives may be included in the core material if desired. The core material is preferably about one-sixth inch in thickness. Core materials of substantially greater thickness are not subject to the problems noted herein. Thinner core materials may be used provided a consolidated fiber product of properties similar to the 1/6-inch thickness product could be made.

The face veneer 12 may be of either hardwood or softwood such as walnut, birch, oak, pine or elm. Standard thickness veneers are used, ranging from 1/36 inch–1/26 inch in thickness.

The back veneer 16 may be of any wood or other material that has a grain direction such as birch, oak, elm, or lauan.

The panel of this invention is made by spreading a standard adhesive such as urea-formaldehyde on the core material 14, securing a face veneer 12 with its grain direction parallel to the length dimension to core material 14, securing a back veneer 16 to core material 14 with its grain direction at right angles to the grain direction of face ply 12, hot pressing the panel, and removing sufficient wood from the back and face veneers to correct the dimensional stability and warp susceptibilities of the panel. This volume of wood may be removed by sanding, using thin veneers, or otherwise. After the face veneer has been finished and the panel has been glue sized, the panel face may then be V-grooved to impart to the panel decorative effects as desired.

The amount of wood removed from the back and face veneers should be that sufficient to correct the stability of the panel. It has been found, for example, in making ¼-inch plywood panels using a 1/6-inch core material and standard thickness (1/36 inch–1/26 inch) face and back veneers, the removal of 0.015 inch–0.025 inch from the back and face veneers is sufficient to impart the desired dimensional stability and warp-free characteristics to the panel.

A test was conducted to measure panel dimensional stability. The panels used were plywood panels 48 inch × 96 inch × ¼ inch made by securing a 1/36-inch face veneer of hardwood to a 1/6-inch particleboard core material with a standard urea adhesive and further securing a back veneer with its grain at right angles to the 96inch dimension to the other surface of the core material. The panel was hot pressed for about 2 minutes at 250° F. After about 6 or 7 hours the panels were trimmed to exact size and the back veneers sanded to remove about 0.020 inch–0.025 inch in thickness. Following this, the face veneer was sanded, removing about 0.005 inch–0.010 inch of its thickness. The panels were then V-grooved, the faces fine sanded (removing another 0.010 inch–0.015 inch and finished by conventional methods.

The full width panel made according to the above procedure and a section of a stud wall were dried to a moisture content of about 2–3 percent. Several of the panels were nailed to the wall and butted together as in an actual installation. The moisture content of the assembly was then raised to about 13–15 percent and the panels observed for any buckling away from the wall occurring due to the increased moisture content. This procedure simulates the change paneling undergoes when installed under dry winter conditions and subsequently exposed to humid summer conditions.

A plywood panel made with a thin particleboard core and parallel face and back veneers was found to buckle away from the wall 3/8 inch–5/8 inch under the above conditions. In addition, when the moisture content was reduced to 2–3 percent, the panels did not entirely flatten out, indicating that permanent damage had occurred.

A plywood panel made according to this invention i.e., with a particleboard core and the back veneer at right angles to the face veneer in grain direction, was found to buckle only about one-sixteenth inch away from the wall.

When the reverse of the above test was performed, that is, when high moisture content panels were applied to a wall and then dried, gaps occurred between the panels. Panels made with a particleboard core and parallel face and back veneers developed gaps of about ¼ inch which is excessive for commercial acceptance. Panels made according to the above invention, however, developed a gap of only about one-sixteenth inch which is considered acceptable.

What is claimed is:

1. A dimensionally stabilized plywood panel having an inner core of consolidated fiber material, a face ply, a back ply, said inner core having inadequate thickness to restrain the dimensional changes due to changing moisture contents of face and back veneers when their grains are parallel, wherein the grain direction of said face ply is perpendicular to the grain direction of said back ply.

2. The panel according to claim 1 wherein the face and back plies are from 1/36 inch–1/26 inch in thickness prior to sanding.

3. The panel according to claim 1 wherein the core material is approximately 1/6 inch in thickness.

4. The panel according to claim 3 wherein the back and face plies have a thickness ranging from 0.010 inch–0.020 inch.

5. The panel according to claim 1 wherein the face ply is a hardwood material selected from the group consisting of oak, elm, birch, and walnut.

6. The panel according to claim 1 wherein the back ply is a hardwood material.

7. A method of making a dimensionally stabilized hardwood plywood panel comprising
   a. spreading an adhesive on each surface of a consolidated fiber core material,
   b. laying a hardwood face veneer of 1/36 inch–1/26 inch in thickness on one surface of the core material,
   c. laying a hardwood back veneer of substantially the same thickness as the face veneer on the other surface of the core material with its grain direction perpendicular to the grain direction of the face veneer,
   d. pressing the panel under heat and pressure to secure the laminations, and
   e. removing an equal amount of wood from the face and back plies sufficient to reduce excessive warpage of the panel.

* * * * *